United States Patent
Mori et al.

(10) Patent No.: US 7,385,494 B2
(45) Date of Patent: Jun. 10, 2008

(54) TIRE LOCATION DETECTING APPARATUS WITH TRANSMITTERS CONFIGURED TO TRANSMIT SIGNALS AT PREDETERMINED ANGULAR POSITIONS

(75) Inventors: Masashi Mori, Oobu (JP); Nobuya Watabe, Nagoya (JP)

(73) Assignee: Denso Corporation, Kariya, Aichi-pref. (JP)

(*) Notice: Subject to any disclaimer, the term of this patent is extended or adjusted under 35 U.S.C. 154(b) by 219 days.

(21) Appl. No.: 11/429,441

(22) Filed: May 8, 2006

(65) Prior Publication Data

US 2006/0250228 A1 Nov. 9, 2006

(30) Foreign Application Priority Data

May 6, 2005 (JP) ............... 2005-135101

(51) Int. Cl.
B60C 23/00 (2006.01)
(52) U.S. Cl. .............. 340/442; 340/438; 73/146
(58) Field of Classification Search ........... 340/442, 340/448, 438; 73/146
See application file for complete search history.

(56) References Cited

U.S. PATENT DOCUMENTS

| | | | |
|---|---|---|---|
| 6,018,993 A | 2/2000 | Normann et al. | 73/146.5 |
| 6,489,888 B1 | 12/2002 | Honeck et al. | 340/442 |
| 6,741,170 B2 * | 5/2004 | Alrabady | 340/438 |
| 2002/0047715 A1 | 4/2002 | Holm | 324/683 |
| 2003/0020604 A1 * | 1/2003 | Fischer et al. | 340/442 |
| 2004/0056764 A1 * | 3/2004 | Kusunoki et al. | 340/442 |
| 2004/0246117 A1 | 12/2004 | Ogawa et al. | 340/445 |

FOREIGN PATENT DOCUMENTS

| | | |
|---|---|---|
| EP | 1 172 656 A1 | 7/2000 |
| JP | 3212311 | 7/2001 |
| JP | 2004-359120 | 12/2004 |
| JP | 2005-47470 | 2/2005 |
| JP | 2005-112056 | 4/2005 |

* cited by examiner

*Primary Examiner*—Phung T. Nguyen
(74) *Attorney, Agent, or Firm*—Nixon & Vanderhye P.C.

(57) ABSTRACT

According to the invention, a wheel identifying apparatus includes a plurality of transmitters and a receiver. Each of the transmitters is mounted on one of wheels of a vehicle with a given distance from a rotation axis of the wheel. Each of the transmitters is configured to transmit a signal when an angular position thereof coincides with a predetermined angular position. The receiver includes a receiving antenna located at such a predetermined position on a body of the vehicle that all distances from the receiving antenna to the rotation axes of the wheels of the vehicle are different from each other. The receiver works to receive all the signals transmitted from the transmitters, detect the received signal levels of the signals, and identify, for each of the signals, the wheel on which the transmitter having transmitted the signal is located, based on the detected received signal level of the signal.

19 Claims, 6 Drawing Sheets

TIRE LOCATION DETECTING APPARATUS WITH TRANSMITTERS CONFIGURED TO TRANSMIT SIGNALS AT PREDETERMINED ANGULAR POSITIONS

CROSS-REFERENCE TO RELATED APPLICATION

This application is based on and claims priority from Japanese Patent Application No. 2005-135101, filed on May 6, 2005, the content of which is hereby incorporated by reference into this application.

BACKGROUND OF THE INVENTION

1. Technical Field of the Invention

The present invention relates generally to tire location detecting apparatuses for automatically detecting the locations of tires on a vehicle and tire inflation pressure detecting apparatuses for detecting the inflation pressures of tires on a vehicle.

More particularly, the invention relates to an efficient tire location detecting apparatus which is integrated into a direct-type tire inflation pressure detecting apparatus.

2. Description of the Related Art

Conventional direct-type tire inflation pressure detecting apparatuses generally include a plurality of transmitters and a receiver.

Each of the transmitters is directly installed to one of a plurality of wheels of a vehicle and includes a pressure sensor working to sense the inflation pressure of a tire mounted on the wheel. Each of the transmitters is configured to transmit a pressure signal representative of the inflation pressure of the tire sensed by the pressure sensor.

The receiver is installed to the body of the vehicle and includes at least one antenna. The receiver is configured to receive the pressure signals transmitted from the transmitters via the antenna and determine the inflation pressures of the tires based on the respective received pressure signals.

In the above arrangement, in addition to the pressure signals sent out from the transmitters, the receiver may also receive pressure signals that are sent out from external transmitters. However, it is impossible for the receiver to determine whether a pressure signal received thereby has been sent out from one of the transmitters or from an external transmitter. Moreover, it is also impossible for the receiver to detect the locations of the transmitters (i.e., the tires) on the vehicle. In other words, the receiver cannot identify the wheel on which the transmitter having sent out a pressure signal and the tire whose inflation pressure is indicated by the pressure signal are located.

To solve the above problems, each of the transmitters may be configured to transmit an identification signal (to be referred to as ID signal hereinafter) representative of the identity thereof along with the pressure signal. On the other hand, the receiver may be configured to have registered therein reference ID signals, each of which coincides with the ID signal of one of the transmitters and is associated with the location of that transmitter.

Thus, the receiver may work to compare an ID signal received thereby with the reference ID signals registered therein and identify the transmitter which has sent out the ID signal when the ID signal coincides with one of the reference ID signals.

Consequently, the receiver can identify the wheel on which the identified transmitter is mounted. More specifically, the receiver can determine whether the wheel is a FR (front-right), a FL (front-left), a RR (rear-right), or a RL (rear-left) wheel of the vehicle. Further, the receiver can determine the inflation pressure of the tire fitted on the identified wheel based on the pressure signal received along with the ID signal.

However, with the above configuration, it is required to previously register the ID signals specific to the respective transmitters as reference ID signals in the receiver through associating the ID signals with the locations of the respective transmitters on the vehicle (i.e., the wheels on which the respective transmitters are mounted). Moreover, as tire replacement or rotations are performed, it is required to update the reference ID signals in the receiver.

However, the registration of the ID signals in the receiver is a time-consuming task, and thus it is required to automatically perform the registration task. Further, for automatically performing the registration task, it is required to automatically detect the locations of the transmitters (i.e., the locations of the associated tires) on the vehicle.

To meet the above requirements, U.S. Pat. No. 5,602,524 proposes a method, according to which a triggering device is provided for each of the wheels to transmit a trigger signal, one of the transmitters transmits the ID signal specific thereto to the receiver upon being triggered by the trigger signal, and the receiver associates the ID signal and the location of the triggered transmitter and registers therein the ID signal as a reference ID signal.

However, with this method, a triggering device is required for each wheel, thus increasing the parts count and manufacturing cost of the tire inflation pressure detecting apparatus.

Moreover, European Patent Application No. 1172656 proposes a method, according to which two accelerometers with different sensing directions are employed to detect the rotation direction of a vehicle wheel.

However, with the detected rotation direction of the wheel, it is only possible to determine the right/left location of the transmitter on the wheel.

U.S. Pat. No. 6,018,993 proposes a method, according to which the receiver records the intensities (i.e., levels) of the signals received from the transmitters via the respective receiving antennas and determines the locations of the transmitters based on the recorded intensities of the signals.

However, with this method, it takes time to record the intensities of the signals. Moreover, an additional means (or device) is required to perform the recording task, increasing the manufacturing cost of the tire inflation pressure detecting apparatus.

U.S. Pat. No. 6,489,888 proposes a method, according to which the receiver determines the locations of the transmitters based on the respective distributions of RSSI (Received Signal Strength Indicator) values for the signals transmitted from the transmitters.

However, with this method, it takes time to obtain the distributions of RSSI values. Moreover, an additional means (or device) is required to obtain the distributions of RSSI values, increasing the manufacturing cost of the tire inflation pressure detecting apparatus.

SUMMARY OF THE INVENTION

The present invention has been made in view of the above-mentioned problems.

It is, therefore, an object of the present invention to provide an efficient tire location detecting apparatus for automatically detecting the locations of tires on a vehicle.

It is another object of the present invention to provide a tire inflation pressure detecting apparatus for a vehicle which includes the tire location detecting apparatus to automatically detect the locations as well as the inflation pressures of tires on the vehicle.

In accordance with the present invention, there is provided a first wheel identifying apparatus which includes a plurality of transmitters and a receiver.

Each of the transmitters is mounted on one of a plurality of wheels of a vehicle with a given distance from a rotation axis of the one of the wheels. Each of the transmitters is configured to transmit a signal when an angular position thereof coincides with a predetermined angular position.

The receiver includes a receiving antenna which is located at such a predetermined position on a body of the vehicle that all distances from the receiving antenna to the rotation axes of the wheels of the vehicle are different from each other. The receiver is configured to:

receive, via the receiving antenna, all the signals transmitted from the transmitters, detect, for each of the received signals, a received signal level thereof, and identify, for each of the received signals, the wheel on which the transmitter having transmitted the received signal is located, based on the detected received signal level of the received signal.

In a further implementation of the invention, the vehicle includes a plurality of tires, each of which is mounted on one of the wheels of the vehicle in association with the transmitter on the one of the wheels.

Since each of the tires is associated with one of the transmitters, the location of each of the tires can be detected through identifying the wheel on which the associated transmitter is located. In other words, the first wheel identifying apparatus constitutes a tire location detecting device for detecting the locations of the tires on the vehicle.

In a still further implementation of the invention, the first wheel identifying apparatus is integrated into a first tire inflation pressure detecting apparatus provided on the vehicle to detect inflation pressures of the tires.

The first tire inflation pressure detecting apparatus further includes a plurality of pressure sensors, each of which is mounted on one of the wheels of the vehicle to sense inflation pressure of the tire on the one of the wheels and outputs a pressure signal representative of the sensed inflation pressure. Each of the transmitters is configured to transmit the pressure signal outputted from an associated one of the pressure sensors as the signal. The receiver is configured to further determine, for each of the received pressure signals, the inflation pressure of the tire associated with the transmitter having transmitted the received pressure signal based on the received pressure signal.

Further in accordance with the present invention, there is provided a second wheel identifying apparatus which includes four rotation direction detecting devices, four transmitters, and a receiver.

Each of the four rotation direction detecting devices is mounted on one of front-right, front-left, rear-right, and rear-left wheels of a vehicle to detect rotation direction of the one of the wheels and outputs a rotation direction signal representative of the detected rotation direction.

Each of the four transmitters is mounted on one of the wheels of the vehicle with a given distance from a rotation axis of the one of the wheels to have association with the rotation direction detecting device on the one of the wheels. Each of the transmitters is configured to transmit a frame that contains the rotation direction signal outputted from the associated rotation direction detecting device when an angular position thereof coincides with a predetermined angular position.

The receiver includes a receiving antenna which is located at such a predetermined position on a body of the vehicle that at least distances from the receiving antenna to the rotation axes of the front-side wheels of the vehicle are different from those from the receiving antenna to the rotation axes of the rear-side wheels of the vehicle. The receiver is configured to:

receive, via the receiving antenna, all the frames transmitted from the transmitters, detect, for each of the received frames, a received signal level thereof, and determine, for each of the received frames, whether the transmitter having transmitted the frame is located on one of the right-side wheels or one of the rear-side wheels of the vehicle based on the rotation direction signal contained in the received frame and whether the same is located on one of the front-side wheels or one of the rear-side wheels of the vehicle based on the received signal level of the received frame.

In a further implementation of the invention, the vehicle includes a plurality of tires, each of which is mounted on one of the wheels of the vehicle in association with the transmitter on the one of the wheels.

Since each of the tires is associated with one of the transmitters, the location of each of the tires can be detected through identifying the wheel on which the associated transmitter is located. In other words, the second wheel identifying apparatus constitutes a tire location detecting device for detecting the locations of the tires on the vehicle.

In a still further implementation of the invention, the second wheel identifying apparatus is integrated into a second tire inflation pressure detecting apparatus provided on the vehicle to detect inflation pressures of the tires.

The second tire inflation pressure detecting apparatus further includes a plurality of pressure sensors, each of which is mounted on one of the wheels of the vehicle to sense inflation pressure of the tire on the one of the wheels and outputs a pressure signal representative of the sensed inflation pressure. Each of the transmitters is configured to assemble into the frame the pressure signal outputted from an associated one of the pressure sensors along with the rotation direction signal outputted from the associated rotation direction detecting device. The receiver is configured to further determine, for each of the received frames, the inflation pressure of the tire associated with the transmitter having transmitted the received frame based on the pressure signal contained in the received frame.

Consequently, through providing the above wheel identifying apparatuses and the tire inflation pressure detecting apparatuses, the objects of the present invention are achieved.

BRIEF DESCRIPTION OF THE DRAWINGS

The present invention will be understood more fully from the detailed description given hereinafter and from the accompanying drawings of the preferred embodiments of the invention, which, however, should not be taken to limit the invention to the specific embodiments but are for the purpose of explanation and understanding only.

In the accompanying drawings:

FIGS. 8A1-8B2 are views illustrating the relationship between the rotation direction of the vehicle wheel and acceleration signals outputted from the accelerometers of the transmitter of FIG. 6.

DESCRIPTION OF THE PREFERRED EMBODIMENTS

The preferred embodiments of the present invention will be described hereinafter with reference to FIGS. 1-8.

It should be noted that, for the sake of clarity and understanding, identical components having identical functions in different embodiments of the invention have been marked, where possible, with the same reference numerals in each of the figures.

First Embodiment

Figure 1:
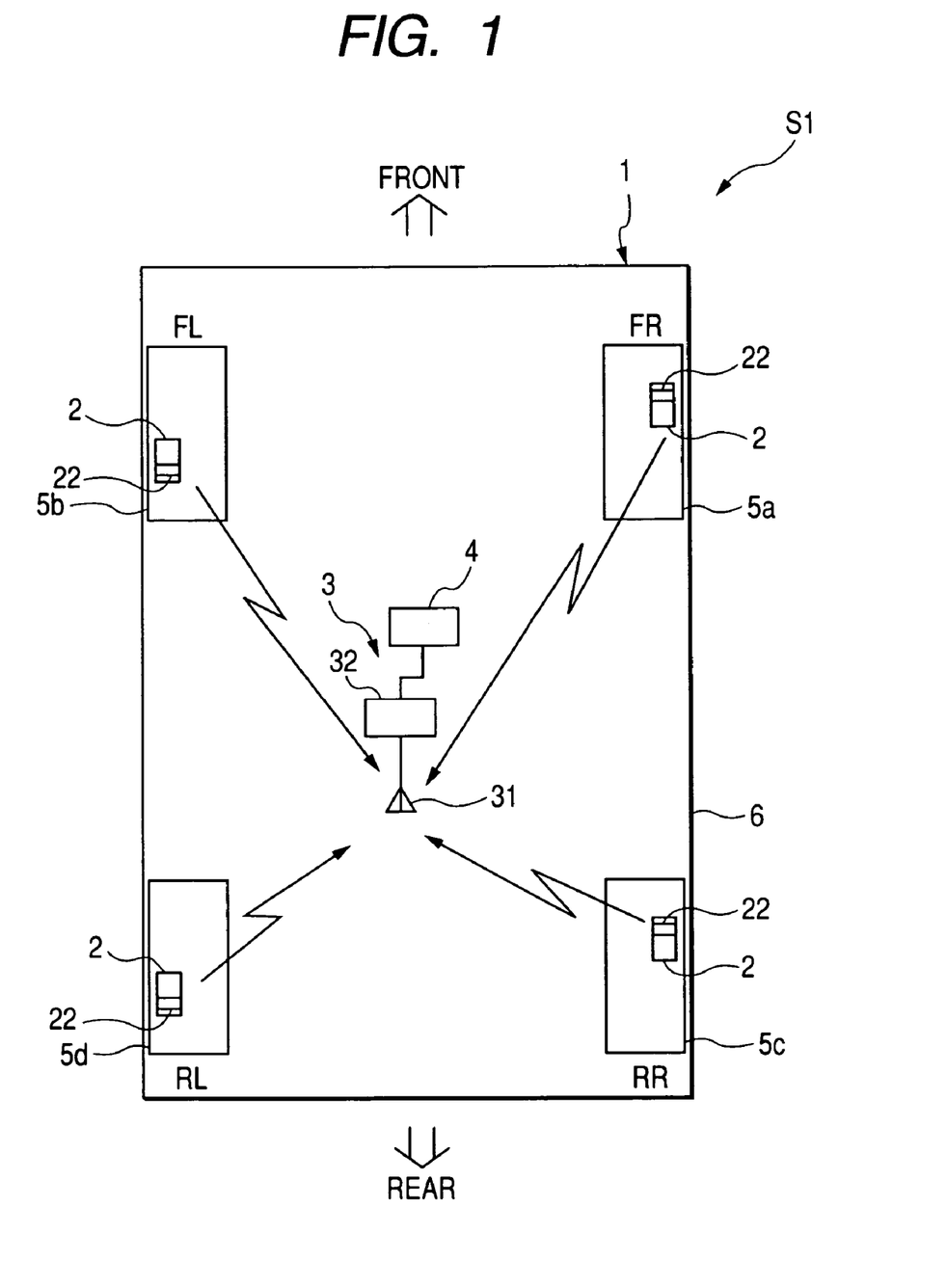
FIG. 1 is a schematic view illustrating the overall configuration of a tire inflation pressure detecting apparatus according to the first embodiment of the invention.

FIG. 1 shows the overall configuration of a tire inflation pressure detecting apparatus S1 according the first embodiment of the invention.

The tire inflation pressure detecting apparatus S1 is installed to a vehicle 1 and configured to detect inflation pressures of four tires each of which is fitted on one of four wheels 5a-5d of the vehicle 1 (i.e., the FR wheel 5a, the FL wheel 5b, the RR wheel 5c, and the RL wheel 5d).

As shown in FIG. 1, the tire inflation pressure detecting apparatus S1 includes four transmitters 2, each of which is installed to one of the four wheels 5a-5d to have association with the tire on the one of the wheels 5a-5d, a receiver 3 installed to the body 6 of the vehicle 1, and a warning device 4 electrically connected to the receiver 3.

Each transmitter 2 works to sense the inflation pressure of the associated tire and transmit a frame that contains a pressure signal representative of the sensed inflation pressure of the associated tire.

Figure 2A:
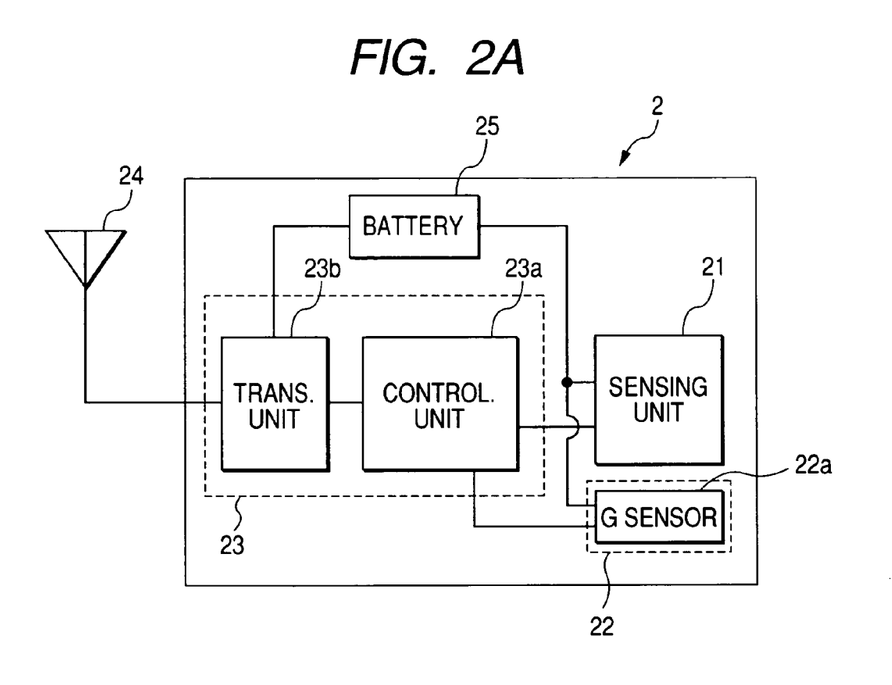
FIG. 2A is a block diagram showing the configuration of a transmitter of the tire inflation pressure detecting apparatus of FIG. 1.

Referring to FIG. 2A, each transmitter 2 is configured with a sensing unit 21, an angular position detecting unit 22, a microcomputer 23, an antenna 24, and a battery 25. The battery 25 works to supply electric power necessary for operations of the other units 21-24.

The sensing unit 21 is configured with sensors, such as a diaphragm-type pressure sensor and a temperature sensor, and works to output signals representative of the sensed inflation pressure of the tire and temperature of air in the tire.

The angular position detecting unit 22 includes an accelerometer (to be referred to as G sensor hereinafter) 22a. The angular position detecting unit 22 works to detect the angular position of the transmitter 2 with respect to a rotation axis of the wheel on which the transmitter 2 is mounted.

The microcomputer 23 is of a well-known type and functionally includes a controlling unit 23a and a transmitting unit 23b. The microcomputer 23 is configured to implement predetermined processes in accordance with a program installed in a memory (not shown) of the controlling unit 23a.

The controlling unit 23a works to receive signals outputted from the sensing unit 21 and process those signals. The controlling unit 23a also works to assemble a frame, which contains the processed signals, and provide the frame to the transmitting unit 23b.

The transmitting unit 23b works to transmit, via the antenna 24, the frame provided by the controlling unit 23a to the receiver 3.

The process of providing the frame from the controlling unit 23a to the transmitting unit 23b is repeatedly performed, once for a predetermined period of time (e.g., 5 minutes). As to be described in detail later, the controlling unit 23a receives a signal outputted from the G sensor 22a, which represents the angular position of the transmitter 2, determines the angular position of the transmitter 2 based on the received signal, and transmits the frame via the transmitting unit 23b when the determined angular position coincides with a predetermined angular position.

In addition, each of the above-described transmitters 2 is fixed, for example, to an air valve of the associated one of the wheels 5a-5d of the vehicle 1 and at least the sensing unit 21 thereof is placed inside the associated tire so as to be exposed to the air in the tire.

Figure 2B:
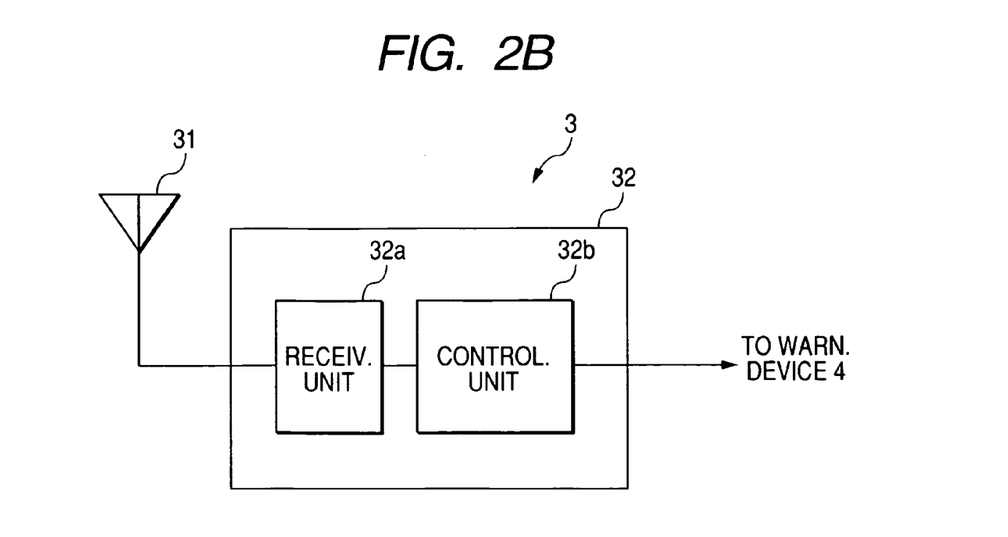
FIG. 2B is a block diagram showing the configuration of a receiver of the tire inflation pressure detecting apparatus of FIG. 1.

The receiver 3 works to receive all the frames transmitted from the transmitters 2 and determine the inflation pressures of the four tires based on the signals contained in the respective frames. The receiver 3 also works to identify, for each of the received frames, the wheel on which the transmitter 2 having sent out the frame and the tire associated with the transmitter 2 are located.

Referring to FIG. 2B, the receiver 3 is configured with a receiving antenna 31 and a microcomputer 32.

The receiving antenna 31 is employed to receive, as illustrated in FIG. 1, all the frames transmitted from the four transmitters 2. In this embodiment, the receiving antenna 31 is fixed to the body 6 of the vehicle 1 at such a predetermined position that all the distances from the receiving antenna 31 to the rotation axes of the wheels 5a-5d are different from each other.

The microcomputer 32 is of a well-known type and functionally includes a receiving unit 32a and a controlling unit 32b. The microcomputer 32 is configured to implement predetermined processes, based on signals contained in the frames transmitted from the transmitters 2, in accordance with a program installed in a memory (not shown) of the controlling unit 32b.

The receiving unit 32a works to receive, via the receiving antenna 31, all the frames transmitted from the transmitters 2 and provide the received frames to the controlling unit 32b.

The controlling unit 32b works to determine, for each of the frames received from the receiving unit 32a, the inflation pressure of the tire associated with the transmitter 2 having sent out the frame based on the signals contained in the frame. In addition, as to be described in detail later, the controlling unit 32b further identifies, for each of the received frames, the wheel on which the transmitter 2 having sent out the frame and the tire associated with the transmitter 2 are located.

Thus, both the inflation pressure and the location of each of the four tires are determined by the controlling unit 32b. When the determined inflation pressure of any of the four tires is decreased to below a predetermined threshold, the controlling unit 32b outputs a warning signal indicative of the decreased inflation pressure and the location of the tire.

The warning device 4 is arranged, as illustrated in FIG. 1, in a location visible for the driver of the vehicle 1. The warning device 4 is configured with, for example, a warning display. The warning device 4 works to inform, upon receiving the warning signal outputted from the controlling unit 32b, the driver of the decreased inflation pressure and the location of the tire.

After having described the overall configuration of the tire inflation pressure detecting apparatus S1, a tire location detecting process thereof will be described hereinafter.

Figure 3A:
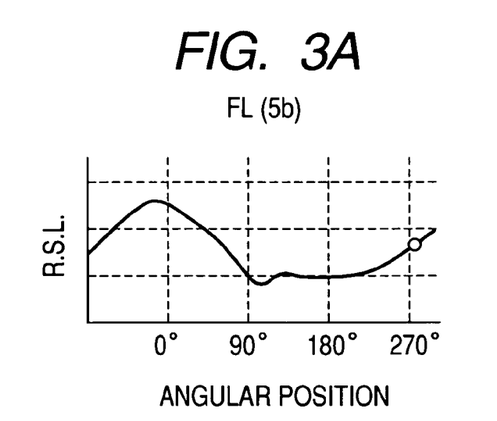
FIGS. 3A-3D are views showing the relationships between the received signal levels at the receiver and the angular positions of transmitters on different wheels of a vehicle in the tire inflation pressure detecting apparatus of FIG. 1.
Figure 3B:
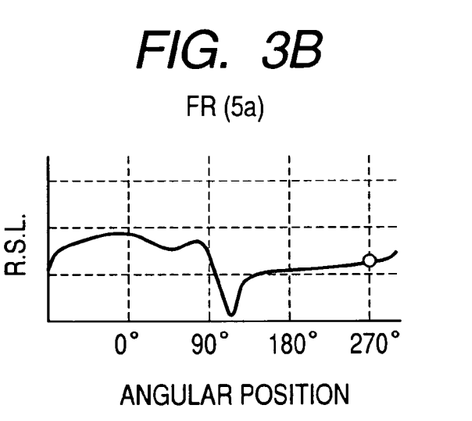
Figure 3C:
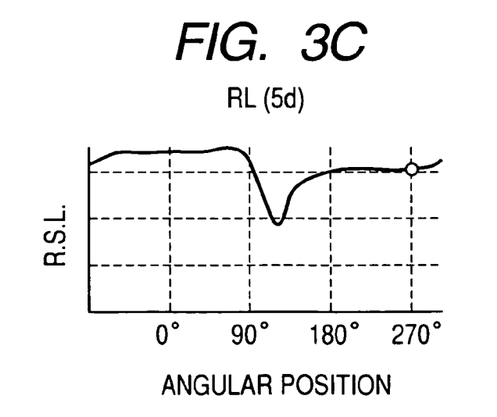
Figure 3D:
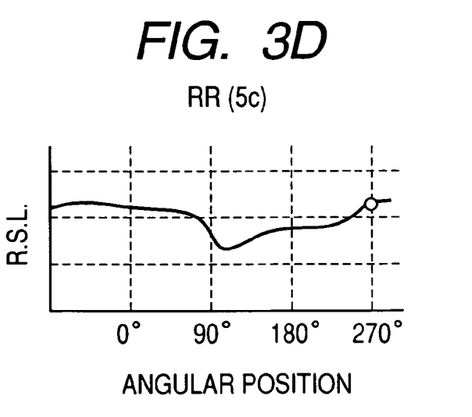

FIG. 3A shows the relationship between the received signal level at the receiver 3 of the frame transmitted from the transmitter 2 on the FL wheel 5b and the angular position of the transmitter 2 on the FL wheel 5b. FIG. 3B shows the relationship between the received signal level at the receiver 3 of the frame transmitted from the transmitter 2 on the FR wheel 5a and the angular position of the transmitter 2 on the FR wheel 5a. FIG. 3C shows the relationship between the received signal level at the receiver 3 of the frame transmitted from the transmitter 2 on the RL wheel 5d and the angular position of the transmitter 2 on the RL wheel 5d. FIG. 3D shows the relationship between the received signal level at the receiver 3 of the frame transmitted from the transmitter 2 on the RR wheel 5c and the angular position of the transmitter 2 on the RR wheel 5c.

As shown in FIGS. 3A-3D, the received signal levels at the receiver 3 of the frames change with the angular positions of the respective transmitters 2 on the associated wheels 5a-5d. This is because the distances from the transmitters 2 to the receiving antenna 31 of the receiver 3 change with rotation of the associated wheels 5a-5d (i.e., with the angular positions of the transmitters 2 on the associated wheels 5a-5d). In addition, for all the transmitters 2, the angular positions thereof take the value of 0 at the highest positions on the associated wheels 5a-5d, the value of 90° at the most front positions, the value of 180° at the lowest positions, and the value of 270° at the most rear positions. Accordingly, when the vehicle 1 runs forward, the angular positions of the two transmitters 2 on the right-side wheels 5a and 5c increase in the clockwise direction while those of the two transmitters 2 on the left-side wheels 5b and 5d increase in the counterclockwise direction.

As described above, in this embodiment, all the distances from the receiving antenna 31 of the receiver 3 to the wheels 5a-5d are different from each other. Therefore, if all the transmitters 2 transmit the respective frames at the same angular position, all the received signal levels at the receiver 3 of the frames transmitted from the transmitters 2 depend only on the distances from the receiving antenna 31 to the respective associated wheels 5a-5d and thus are different from each other.

Considering the above feature, in this embodiment, all the transmitters 2 are configured to transmit the respective frames when the angular positions thereof coincide with a predetermined angular position.

The predetermined angular position may have any value; however, to allow the receiver 3 to most accurately differentiate the received signal levels of the received frames from one another, the predetermined angular position is preferably such that an average of all differences between the received signal levels of the received frames transmitted from two different ones of the transmitters 2 has a maximum value. In this way, in the present embodiment, the predetermined angular position is set to 270°.

On the other hand, the receiver 3 is configured to detect, for each of the received frames, the received signal level of the frame and identify the wheel on which the transmitter 2 having sent out the frame and the tire associated with the transmitter 2 are located based on the detected received signal level of the frame.

More specifically, the controlling unit 32b of the receiver 3 has stored in the memory thereof a predetermined sequence of the wheels 5a-5d, which are made based on the distances from the receiving antenna 31 of the receiver 3 to the wheels 5a-5d. In this embodiment, with reference to FIG. 1, the wheels 5a-5d are pre-sequenced according to the closeness thereof to the receiving antenna 31, resulting in the predetermined sequence of the wheels 5a-5d as being (5d, 5c, 5b, 5a).

After detection of the received signal levels of the received frames, the controlling unit 32b sequences the received frames according to the highness of the received signal levels of the received frames. Then, the controlling unit 32b identifies, for each of the received frames, the wheel on which the transmitter 2 having sent out the frame and the tire associated with the transmitter 2 are located, through matching the sequence of the received frames with the predetermined sequence of the wheels 5a-5d.

Consequently, as shown in FIGS. 3A-3D, the received frame which has the highest received signal level is identified as being transmitted from the transmitter 2 on the RL wheel 5d, that which has the second received signal level is identified as being transmitted from the transmitter 2 on the RR wheel 5c, that which has the third received signal level is identified as being transmitted from the transmitter 2 on the FL wheel 5b, and that which has the lowest received signal level is identified as being transmitted from the transmitter 2 on the FR wheel 5a.

Figure 4:
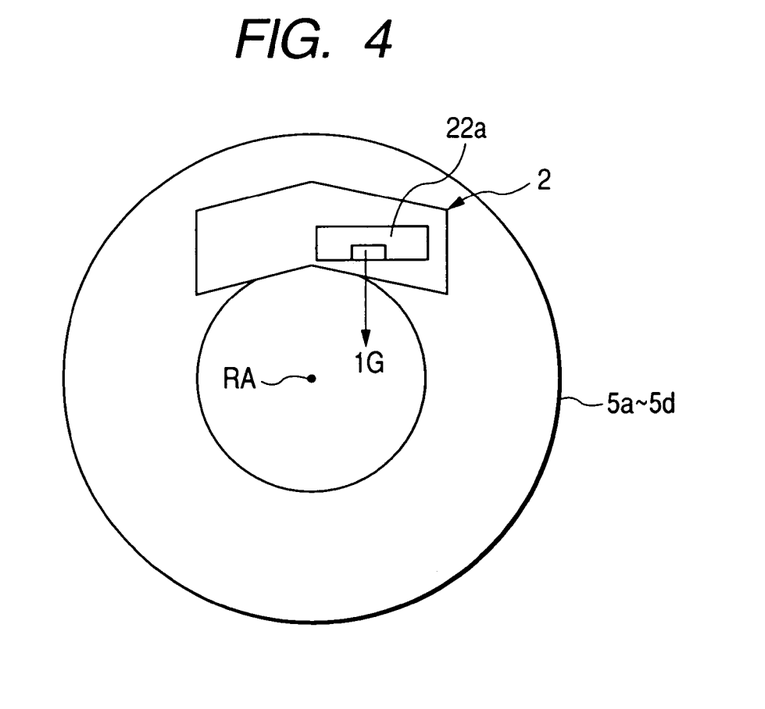
FIG. 4 is a schematic view illustrating the arrangement of the transmitter of FIG. 2A, which includes an accelerometer, on a vehicle wheel.
Figure 5:
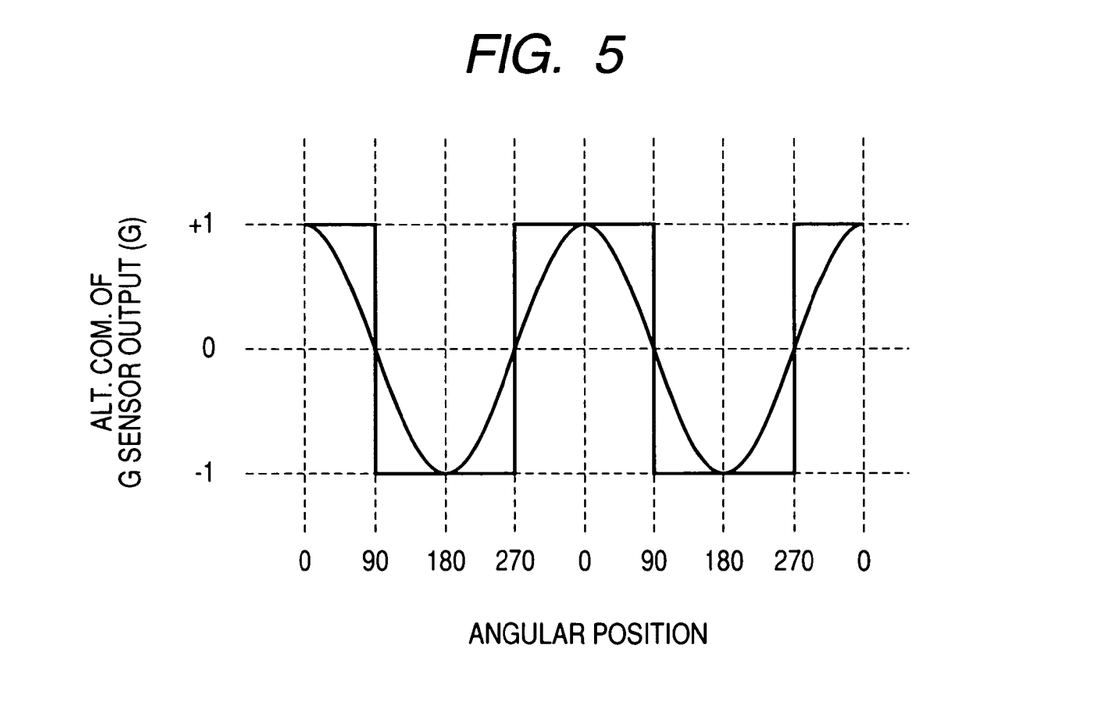
FIG. 5 is a view showing the relationship between an acceleration signal outputted from the accelerometer of the transmitter of FIG. 2A and the angular position of the transmitter on the vehicle wheel.

Referring now to FIGS. 4 and 5, detection of the angular positions of the transmitters 2 according the present embodiment will be described.

FIG. 4 shows the arrangement of each of the transmitters 2 on the associated one of the wheels 5a-5d.

As shown in FIG. 4, each of the transmitters 2 includes the G sensor 22a and is arranged on the associated wheel with a given distance from the rotation axis RA of the associated wheel. In this embodiment, the G sensor 22a is arranged to sense acceleration in the radial direction of the associated wheel. However, the G sensor 22a may also be arranged to sense acceleration in the tangential direction of the associated wheel.

FIG. 5 shows the alternating component of an acceleration signal outputted from the G sensor 22a when the vehicle 1 runs at a constant speed.

As shown in FIG. 5, the acceleration signal outputted from the G sensor 22a varies with rotation of the wheel, due to the change in relation between the sensing direction of the G sensor 22a and the direction of gravity. For example, the acceleration signal outputted from the G sensor 22a has the maximum value when the transmitter 2 is at the highest position (i.e., at the angular position of 0°) and the minimum value when the same is at the lowest position (i.e., the angular position of 180°).

Accordingly, it is possible to detect the angular position of the transmitter 2 based on the acceleration signal outputted from the G sensor 22a. More specifically, as shown in FIG. 5, a pulse signal can be obtained by processing the acceleration signal outputted from the G sensor 22a with a threshold of 0 G. This pulse signal rises at the angular position of 270° and drops at the angular position of 90°. Therefore, it is possible to determine whether the angular position of the transmitter 2 coincides with the predetermined angular position of 270° by detecting the rising edge of the pulse signal.

In addition, in this embodiment, the detection of the angular positions of the transmitters 2 is carried out only when the vehicle 1 is runs forward. Further, to determine whether the vehicle 1 runs forward or backward, each of the transmitters 2 may be configured to further include a running direction detecting device (e.g. a gear position sensor).

The above-described tire inflation pressure detecting apparatus S1 according to the present embodiment operates in the following way.

In each of the transmitters 2, the controlling unit 23a receives the acceleration signal outputted from the G sensor 22a as well as the signals representative of the inflation pressure of the associated tire and the temperature of air in the associated tire which are outputted from the sensing unit 21.

Then, the controlling unit 23a processes those signals which are outputted from the sensing unit 21 and assembles the frame which contains the processed signals.

Further, the controlling unit 23a determines, during each the predetermined period of time, a transmission time and transmits the frame at the determined transmission time. More specifically, the transmission time is determined by detecting the rising edge of the pulse signal derived from the acceleration signal outputted from the G sensor 22a, so that the frame is sent out from the transmitter 2 when the angular position of the transmitter 2 coincides with the predetermined angular position of 270°.

On the other hand, in the receiver 3, the receiving unit 32a receives via the single antenna 31 all the frames transmitted from the transmitters 2 and provides the received frames to the controlling unit 32b.

The controlling unit 32b detects, for each of the frames received by the receiving unit 32a, the received signal level of the frame.

Then, the controlling unit 32b identifies, for each of the received frames, the wheel on which the transmitter 2 having sent out the frame is located, based on the received signal level of the frame.

Further, the controlling unit 32b determines, for each of the received frames, the inflation pressure of the tire that is associated with the transmitter 2 having sent out the frame, based on the signals contained in the frame. In the determination of the inflation pressure, temperature-compensation is made if the determined temperature of air in the tire falls out of a given range.

Thus, both the inflation pressure and the location of each of the four tires of the vehicle 1 are determined by the controlling unit 32b. When the determined inflation pressure of any of the four tires is decreased to below the predetermined threshold, the controlling unit 32b outputs the warning signal to the warning device 4, so that the driver of the vehicle 1 is informed of the decreased inflation pressure and the location of the tire by the warning device 4.

The above-described tire inflation pressure detecting apparatus S1 according to the present embodiment has the following advantages.

First, in the present embodiment, each of the transmitters 2 is configured to transmit the frame when the angular position thereof coincides with the predetermined angular position; the antenna 31 of the receiver 3 is configured to be located at the predetermined position with different distances from the transmitters 2.

With such a configuration, it is possible for the receiver 3 to reliably identify, for each of the frames transmitted from the transmitters 2, the wheel on which the transmitter 2 having sent out the frame is located based on the received signal level of the frame.

Consequently, the locations of the four tires, each of which is associated with one of the transmitters 2, can be automatically and reliably detected.

Further, for each of the transmitters 2, since all frame transmissions are carried out with the same angular position of the transmitter 2, the variation in the received signal levels of the frames that are transmitted by the same transmitter 2 for different periods of time can be effectively suppressed.

Consequently, it becomes possible for the receiver 3 to accurately and speedily identify the locations of the tires without recording the received signal levels or determining distributions of the RSSI values, thus simplifying the configuration and decreasing the manufacturing cost of the tire inflation pressure detecting apparatus S1.

Furthermore, since all the transmitters 2 with the same configuration can be identified without performing any ID signal registration, the efficiency of installation of the tire inflation pressure detecting apparatus S1 to the vehicle 1 can be remarkably improved.

Second Embodiment

In this embodiment, a tire inflation pressure detecting apparatus S2 is provided which has almost the same configuration as the tire inflation pressure detecting apparatus S1 according to the previous embodiment. Accordingly, only the differences therebetween will be described below.

In the previous embodiment, the receiver 3 identifies the locations of the transmitters 2 based only on the received signal levels of the received frames.

In comparison, in the present embodiment, the receiver 3 identifies the locations of the transmitters 2 based not only on the received signal levels of the received frames but also on the rotation directions of the associated wheels 5a-5d.

Figure 6:
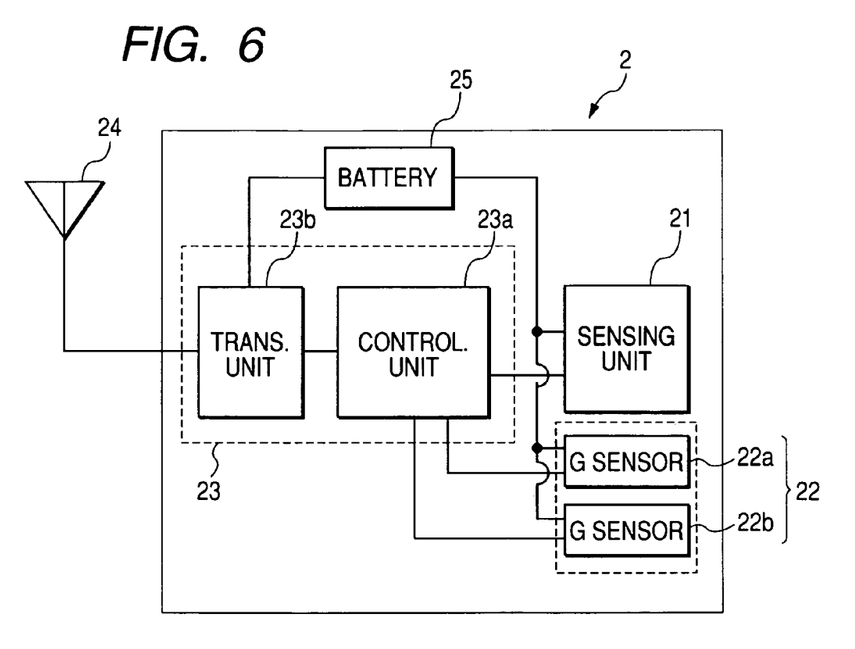
FIG. 6 is a block diagram showing the configuration of a transmitter of a tire inflation pressure detecting apparatus according to the second embodiment of the invention.

FIG. 6 shows the configuration of each of the transmitters 2 according to the present embodiment.

As shown in FIG. 6, in each of the transmitters 2 of the tire inflation pressure detecting apparatus S2, the unit 22 includes two G sensors 22a and 22b, so as to serve as a rotation direction detecting unit as well as the angular position detecting unit.

Figure 7:
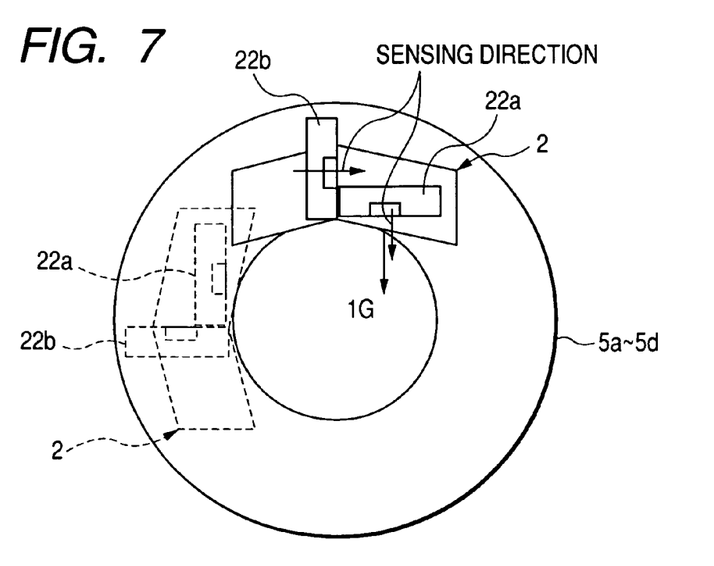
FIG. 7 is a schematic view illustrating the arrangement of the transmitter of FIG. 6, which includes two accelerometers, on a vehicle wheel.

Referring to FIG. 7, the G sensors 22a and 22b are so arranged on the associated one of the wheels 5a-5d to sense different accelerations. More specifically, as in the previous embodiment, the G sensor 22a is arranged to sense acceleration in the radial direction of the associated wheel. In comparison, the G sensor 22b is arranged to sense acceleration in the tangential direction of the associated wheel.

FIGS. 8A1-8B2 illustrate the relationship between the rotation direction of the wheel and the acceleration signals outputted from the G sensors 22a and 22b.

As described previously, the acceleration signal outputted from the G sensor 22a varies with rotation of the wheel, due to the change in the relation between its sensing direction and the direction of gravity. More specially, the acceleration signal outputted from the G sensor 22a has the maximum value when the transmitter 2 is at the highest position as indicated by solid lines in FIG. 7 and the minimum value when the transmitter 2 is at the lowest position.

In comparison, the acceleration signal outputted from the G sensor 22b also varies with rotation of the wheel, due to the same reason as above. More specially, the acceleration signal outputted from the G sensor 22b has the minimum value when the transmitter 2 is at one middle position as indicated by dashed lines in FIG. 7 and the maximum value when the transmitter 2 is at the other middle position (i.e., the most right position in FIG. 7).

Consequently, there exists a difference of 90° in phase between the acceleration signals outputted from the G sensors 22a and 22b.

Figure 8A:
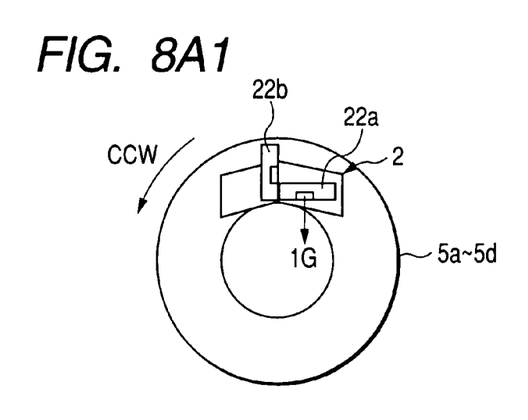
Figure 8A:
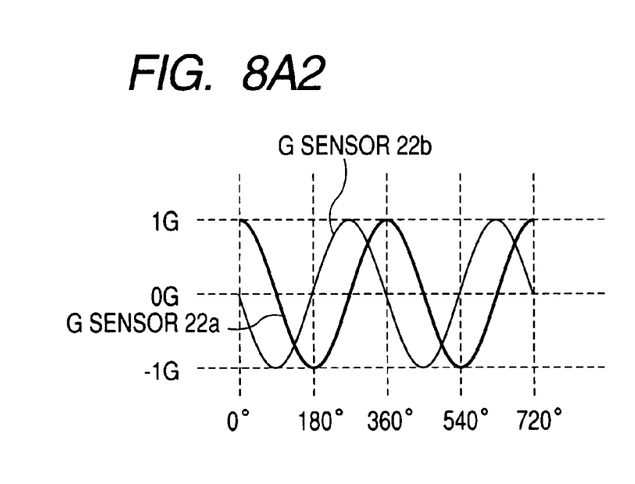
Figure 8B:
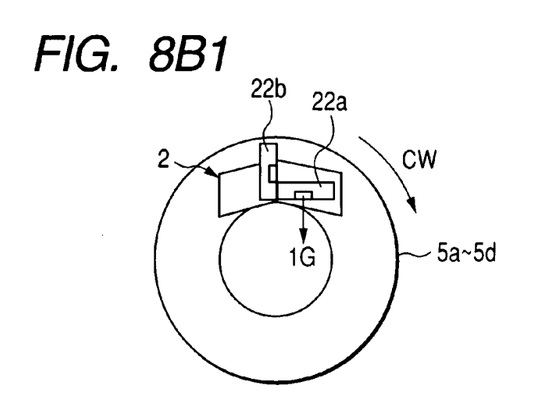
Figure 8B:
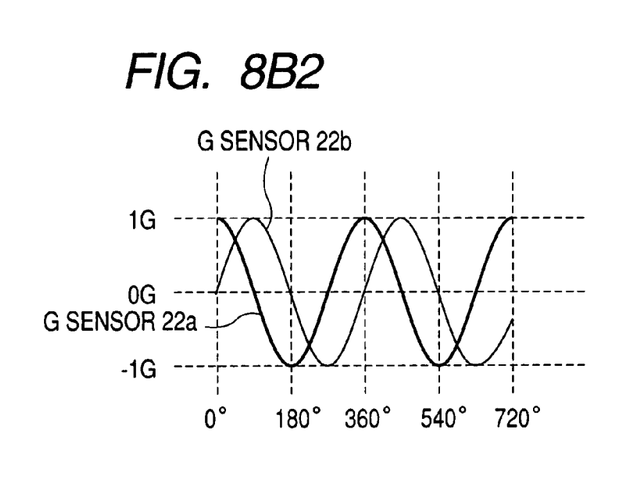

More specifically, when the wheel rotates in the counter-clockwise (CCW) direction as shown in FIG. 8A1, the alternating component of the acceleration signal outputted from the G sensor 22a leads that from the G sensor 22b by 90° in phase, as shown in FIG. 8A2. On the contrary, when the wheel rotates in the clockwise (CW) direction as shown in FIG. 8B1, the alternating component of the acceleration signal outputted from the G sensor 22a lags that from the G sensor 22b by 90° in phase, as shown in FIG. 8B2.

Based on the above lead/lag relationship between the acceleration signals outputted from the G sensors 22a and 22b, the controlling unit 23a of each of the transmitters 2 determines the rotation direction of the associated one of the wheels 5a-5d and generates and assembles into the frame a rotation direction signal representative of the determined rotation direction.

In addition, in this embodiment, both the detection of the rotational directions of the associated wheels and the detection of the angular positions of the transmitters 2 are carried out only when the vehicle 1 runs forward. Further, to determine whether the vehicle 1 is running forward or backward, each of the transmitters 2 may be configured to further include a running direction detecting device (e.g. a gear position sensor).

Further, as in the previous embodiment, the controlling unit 23a determines, during each the predetermined period of time, a transmission time and transmits the frame at the determined transmission time. More specifically, the transmission time is determined by detecting the rising edge of the pulse signal derived from the acceleration signal outputted from the G sensor 22a, so that the frame is sent out from the transmitter 2 when the angular position of the transmitter 2 coincides with the predetermined angular position of 270°.

On the other hand, in the receiver 3 of the tire inflation pressure detecting apparatus S2, the receiving antenna 31 is fixed to the body 6 of the vehicle 1 at such a predetermined position that at least distances from the receiving antenna 31 to the front-side wheels 5a and 5b are different from those from the receiving antenna 31 to the rear-side wheels 5c and 5d.

For example, the receiving antenna 31 my be so arranged on the body 6 of the vehicle 1 to lie on the center line of the vehicle 1 extending in the longitudinal direction of the vehicle 1 and be closer to the rear axle of the vehicle 1 than the front axle.

With such an arrangement, the controlling unit 32b of the receiver 3 can determine, for each of the frames received by the receiving unit 32a, whether the transmitter 2 having sent out the frame is located on one of the right-side wheels 5a and 5c or one of the left-side wheels 5b and 5d based on the rotation direction signal contained in the frame and whether the same is located on one of the front-side wheels 5a and 5b or one of the rear-side wheels 5c and 5d based on the received signal level of the frame.

Consequently, the locations of the transmitters 2 and thus those of the tires each of which is associated with one of the transmitters 2 can be reliably identified.

The above-described tire inflation pressure detecting apparatus S2 has the same advantages as the tire inflation pressure detecting apparatus S1 described in the previous embodiment.

In addition, in each of the transmitters 2 of the tire inflation pressure detecting apparatus S2, the unit 22 serves as both the angular position detecting unit and the rotation direction detecting unit, thus simplifying the configuration and decreasing the manufacturing cost of the tire inflation pressure detecting apparatus S2.

OTHER EMBODIMENTS

While the above particular embodiments of the invention have been shown and described, it will be understood by those who practice the invention and those skilled in the art that various modifications, changes, and improvements may be made to the invention without departing from the spirit of the disclosed concept.

For example, in the first embodiment, the controlling unit 32b of the receiver 3 is configured to have stored in the memory thereof the predetermined sequence of the wheels 5a-5d, sequence the received frames based on the received signal levels of the received frames, and identify, for each of the received frames, the wheel on which the transmitter 2 having sent out the frame is located through matching the sequence of the received frames with the predetermined sequence of the wheels 5a-5d.

However, the controlling unit 32b of the receiver 3 may also be configured to have stored in the memory thereof, instead of the predetermined sequence of the wheels 5a-5d, predetermined received signal levels each of which is associated with one of the wheels 5a-5d and identify, for each of the received frames, the wheel on which the transmitter 2 having sent out the frame is located through matching the received signal levels of the received frames with the predetermined received signal levels.

Moreover, in the previous embodiments, when the vehicle 1 runs at high speeds, the angular position of each of the transmitters 2 may change considerably during the transmission of the frame therefrom to the receiver 3, increasing the variation in the received signal level at the receiver 3 of the frame.

To solve such a problem, each of the transmitters 2 may be configured to reduce, when the speed of the vehicle 1 is above a predetermined speed, the transmission time of the frame through reducing the amount of data which the frame contains.

More specifically, each of the transmitters 2 may determine the number of revolutions of the associated wheel based on the frequency of the acceleration signal outputted from the G sensor 22a and then determine the speed of the vehicle 1 based on the determined number of revolutions of the associated wheel.

If the determined speed of the vehicle 1 is above a predetermined speed of, for example, 100 km, each of the transmitters 2 may reduce the transmission time of the frame to, for example, below 10 ms, through reducing the amount of dada which the frame contains. In this case, since the amount of dada transmitted by one transmission of the frame is reduced, the number of frame transmissions is accordingly increased so as to transmit the same total amount of data required to be transmitted to the receiver 3.

Further, in the previous embodiments, only the G sensor 22a is employed to detect the angular position of each of the transmitters 2. However, the angular position of each of the transmitters 2 may also be detected by employing a plurality of G sensors each of which outputs an acceleration signal that varies with rotation of the associated wheel.

Furthermore, in the second embodiment, each of the transmitters 2 employs two G sensors 22a and 22b to detect the rotation direction of the associated wheel.

However, each of the transmitters 2 may employ the G sensor 22b for sensing the acceleration in the tangential direction of the wheel and a running direction detecting device (e.g. a gear position sensor) for detecting the running direction of the vehicle 1 instead of the G sensor 22a. In this case, the rotation direction of the wheel may be detected based on the tangential acceleration signal outputted from the G sensor 22b and a running direction signal that is outputted from the running direction detecting device and indicative of the running direction of the vehicle 1.

Such modifications, changes, and improvements within the skill of the art are possible within the scope of the appended claims.

What is claimed is:

1. A wheel identifying apparatus comprising:
   a plurality of transmitters each of which is mounted on one of a plurality of wheels of a vehicle with a given distance from a rotation axis of the one of the wheels, each of the transmitters being configured to transmit a signal when an angular position thereof coincides with a predetermined angular position; and
   a receiver including a receiving antenna located at such a predetermined position on a body of the vehicle that all distances from the receiving antenna to the rotation axes of the wheels of the vehicle are different from each other, the receiver being configured to:
   receive, via the receiving antenna, all the signals transmitted from the transmitters,
   detect, for each of the received signals, a received signal level thereof, and
   identify, for each of the received signals, the wheel on which the transmitter having transmitted the received signal is located, based on the detected received signal level of the received signal.

2. The wheel identifying apparatus as set fourth in claim 1, further comprising a plurality of angular position detecting devices each of which is mounted on one of the plurality of wheels of the vehicle to detect the angular position of an associated one of the transmitters on the one of the wheels, each of the angular position detecting devices being configured to provide the associated transmitter with an angular position signal representative of the detected angular position of the associated transmitter, and
   wherein, each of the transmitters is configured to determine the angular position thereof based on the angular position signal provided by the associated angular position detecting device and transmit the signal when the determined angular position coincides with the predetermined angular position.

3. The wheel identifying apparatus as set fourth in claim 2, wherein each of the angular position detecting devices includes an accelerometer, which outputs an acceleration signal that varies with rotation of the wheel on which the angular position detecting device is mounted, and detects the angular position of the associated transmitter based on the acceleration signal outputted from the accelerometer.

4. The wheel identifying apparatus as set fourth in claim 1, wherein the predetermined angular position is such that an average of all differences between the received signal levels of the received signals transmitted from two different ones of the transmitters has a maximum value.

5. The wheel identifying apparatus as set fourth in claim 1, wherein the receiver is configured to have a predetermined sequence of the wheels which are made based on the distances from the receiving antenna of the receiver to the wheels, and wherein the receiver is configured to sequence the received signals based on the received signal levels thereof and identify, for each of the received signals, the wheel on which the transmitter having transmitted the received signal is located, through matching the sequence of the received signals with the predetermined sequence of the wheels.

6. The wheel identifying apparatus as set fourth in claim 1, wherein the receiver is configured to have a plurality of predetermined received signal levels each of which is associated with one of the wheels, and wherein the receiver is configured to identify, for each of the received signals, the wheel on which the transmitter having transmitted the received signal is located, through matching the received signal levels of the received signals with the predetermined received signal levels.

7. The wheel identifying apparatus as set fourth in claim 1, wherein each of the transmitters includes a vehicle speed detecting device configured to detect a speed of the vehicle, and wherein each of the transmitters is configured to reduce, when the vehicle speed detected by the vehicle speed detecting device is above a predetermined speed, a transmission time required for the transmitter to transmit the signal through reducing an amount of data which the signal represents.

8. The wheel identifying apparatus as set fourth in claim 1, wherein the vehicle includes a plurality of tires, each of which is mounted on one of the wheels of the vehicle in association with the transmitter on the one of the wheels.

9. The wheel identifying apparatus as set fourth in claim 8, wherein the wheel identifying apparatus is integrated into a tire inflation pressure detecting apparatus provided on the vehicle to detect inflation pressures of the tires, and
   wherein, the tire inflation pressure detecting apparatus further includes a plurality of pressure sensors, each of which is mounted on one of the wheels of the vehicle to sense inflation pressure of the tire on the one of the wheels and outputs a pressure signal representative of the sensed inflation pressure,
   each of the transmitters is configured to transmit the pressure signal outputted from an associated one of the pressure sensors as the signal, and
   the receiver is configured to further determine, for each of the received pressure signals, the inflation pressure of the tire associated with the transmitter having transmitted the received pressure signal based on the received pressure signal.

10. A wheel identifying apparatus comprising:
   four rotation direction detecting devices each of which is mounted on one of front-right, front-left, rear-right, and rear-left wheels of a vehicle to detect rotation direction of the one of the wheels and outputs a rotation direction signal representative of the detected rotation direction;

four transmitters each of which is mounted on one of the wheels of the vehicle with a given distance from a rotation axis of the one of the wheels to have association with the rotation direction detecting device on the one of the wheels, each of the transmitters being configured to transmit a frame that contains the rotation direction signal outputted from the associated rotation direction detecting device when an angular position thereof coincides with a predetermined angular position; and a receiver including a receiving antenna located at such a predetermined position on a body of the vehicle that at least distances from the receiving antenna to the rotation axes of the front-side wheels of the vehicle are different from those from the receiving antenna to the rotation axes of the rear-side wheels of the vehicle, the receiver being configured to:

receive, via the receiving antenna, all the frames transmitted from the transmitters, detect, for each of the received frames, a received signal level thereof, and determine, for each of the received frames, whether the transmitter having transmitted the frame is located on one of the right-side wheels or one of the rear-side wheels of the vehicle based on the rotation direction signal contained in the received frame and whether the same is located on one of the front-side wheels or one of the rear-side wheels of the vehicle based on the received signal level of the received frame.

11. The wheel identifying apparatus as set fourth in claim 10, further comprising a plurality of angular position detecting devices each of which is mounted on one of the plurality of wheels of the vehicle to detect the angular position of an associated one of the transmitters on the one of the wheels, each of the angular position detecting devices being configured to provide the associated transmitter with an angular position signal representative of the detected angular position of the associated transmitter, and wherein, each of the transmitters is configured to determine the angular position thereof based on the angular position signal provided by the associated angular position detecting device and transmit the frame when the determined angular position coincides with the predetermined angular position.

12. The wheel identifying apparatus as set fourth in claim 11, wherein each of the angular position detecting devices includes an accelerometer, which outputs an acceleration signal that varies with rotation of the wheel on which the angular position detecting device is mounted, and detects the angular position of the associated transmitter based on the acceleration signal outputted from the accelerometer.

13. The wheel identifying apparatus as set fourth in claim 10, wherein each of the rotation direction detecting devices includes a first accelerometer, which outputs a first acceleration signal varying with rotation of the wheel on which the rotation direction detecting device is mounted, and a second accelerometer, which outputs a second acceleration signal varying with rotation of the same, and detects the rotation direction of the wheel based on a lead/lag relationship in phase between the first and second acceleration signals outputted from the first and second accelerometers.

14. The wheel identifying apparatus as set fourth in claim 10, wherein the predetermined angular position is such that an average of all differences between the received signal levels of the received frames transmitted from two different ones of the transmitters has a maximum value.

15. The wheel identifying apparatus as set fourth in claim 10, wherein the receiver is configured to have a predetermined sequence of the wheels that are made based on the distances from the receiving antenna of the receiver to the wheels, and wherein the receiver is configured to sequence the received frames based on the received signal levels thereof and determine, for each of the received frames, whether the transmitter having transmitted the frame is located on one of the front-side wheels or one of the rear-side wheels of the vehicle, through matching the sequence of the received frames with the predetermined sequence of the wheels.

16. The wheel identifying apparatus as set fourth in claim 10, wherein the receiver is configured to have a plurality of predetermined received signal levels each of which is associated with one of the wheels, and wherein the receiver is configured to determine, for each of the received frames, whether the transmitter having transmitted the frame is located on one of the front-side wheels or one of the rear-side wheels of the vehicle, through matching the received signal levels of the received frames with the predetermined received signal levels.

17. The wheel identifying apparatus as set fourth in claim 10, wherein each of the transmitters includes a vehicle speed detecting device configured to detect a speed of the vehicle, and wherein each of the transmitters is configured to reduce, when the vehicle speed detected by the vehicle speed detecting device is above a predetermined speed, a transmission time required for the transmitter to transmit the frame through reducing an amount of data which the frame contains.

18. The wheel identifying apparatus as set fourth in claim 10, wherein the vehicle includes a plurality of tires, each of which is mounted on one of the wheels of the vehicle in association with the transmitter on the one of the wheels.

19. The wheel identifying apparatus as set fourth in claim 18, wherein the wheel identifying apparatus is integrated into a tire inflation pressure detecting apparatus provided on the vehicle to detect inflation pressures of the tires, and wherein, the tire inflation pressure detecting apparatus further includes a plurality of pressure sensors, each of which is mounted on one of the wheels of the vehicle to sense inflation pressure of the tire on the one of the wheels and outputs a pressure signal representative of the sensed inflation pressure, each of the transmitters is configured to assemble into the frame the pressure signal outputted from an associated one of the pressure sensors along with the rotation direction signal outputted from the associated rotation direction detecting device, and the receiver is configured to further determine, for each of the received frames, the inflation pressure of the tire associated with the transmitter having transmitted the received frame based on the pressure signal contained in the received frame.

* * * * *